(12) United States Patent
Dallam et al.

(10) Patent No.: US 7,147,725 B2
(45) Date of Patent: *Dec. 12, 2006

(54) COLLOIDAL SILICA BINDER SYSTEM

(75) Inventors: Craig B. Dallam, University Heights, OH (US); Nikhil Karogal, Cleveland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/727,384

(22) Filed: Dec. 4, 2003

(65) Prior Publication Data

US 2005/0121110 A1    Jun. 9, 2005

(51) Int. Cl.
  *B23K 35/362* (2006.01)
(52) U.S. Cl. .......................................... 148/23; 148/24
(58) Field of Classification Search .................. 148/23, 148/24
  See application file for complete search history.

(56) References Cited

U.S. PATENT DOCUMENTS

| | | |
|---|---|---|
| 2,720,473 A | 10/1955 | Donahey |
| 3,501,354 A | 3/1970 | DeLong |
| 3,620,830 A | 11/1971 | Kramer |
| 3,694,259 A | 9/1972 | Chapman et al. |
| 3,783,020 A | 1/1974 | Kimura et al. |
| 3,857,702 A | 12/1974 | Corbett |
| 4,010,309 A | 3/1977 | Petersen |
| 4,045,593 A | 8/1977 | Hill et al. |
| 4,103,067 A | 7/1978 | Jackson et al. |
| 4,131,784 A | 12/1978 | Kimura et al. |
| 4,208,563 A | 6/1980 | Frantzreb, Sr. et al. |
| 4,355,054 A | 10/1982 | Nagano et al. |
| 4,561,912 A | 12/1985 | Courtenay et al. |
| 4,662,952 A | 5/1987 | Barringer et al. |
| 4,725,508 A | 2/1988 | Rangaswamy et al. |
| 4,741,974 A | 5/1988 | Longo et al. |
| 4,940,882 A * | 7/1990 | Bates ..................... 219/146.22 |
| 5,300,754 A | 4/1994 | Gonzalez et al. |
| 5,308,698 A | 5/1994 | Bishel et al. |
| 5,984,161 A | 11/1999 | Koch et al. |
| 6,339,209 B1 * | 1/2002 | Kotecki ................... 219/146.23 |
| 6,384,126 B1 | 5/2002 | Pirtle et al. |
| 6,613,159 B1 | 9/2003 | Koch et al. |
| 6,939,413 B1 * | 9/2005 | Crockett ...................... 148/23 |
| 2004/0187961 A1 | 9/2004 | Crockett |

FOREIGN PATENT DOCUMENTS

| | | |
|---|---|---|
| GB | 1038977 | 8/1966 |
| GB | 1571136 | 7/1980 |
| GB | 1581182 | 12/1980 |
| JP | 63-101093 | 5/1988 |
| JP | 1-233093 | 9/1989 |

* cited by examiner

*Primary Examiner*—Daniel J. Jenkins
(74) *Attorney, Agent, or Firm*—Fay, Sharpe, Fagan, Minnich & McKee, LLP (57) ABSTRACT

A welding flux that includes a flux agent, water glass and colloidal compound formed from small particles of silicon dioxide. The welding flux has a very low hygroscopicity, thus is well suited from low hydrogen electrodes.

63 Claims, 3 Drawing Sheets

COLLOIDAL SILICA BINDER SYSTEM

The present invention is in the general field of welding flux binders and more particularly directed to a non-hygroscopic welding flux binder.

BACKGROUND OF THE INVENTION

In the field of arc welding, the three (3) main types of arc welding are submerged arc welding (SAW), shielded metal arc welding (SMAW), and flux-cored arc welding (FCAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten and molten filler metal is deposited from the electrode onto the work. The molten filler metal displaces flux pool and forms the weld. In shielded metal arc welding, shielding is by a flux coating instead of a loose granular blanket of flux. In flux-cored electrodes, the flux is contained within the metal sheath.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Practically all slag-forming compounds may be classed as either acidic or basic, according to which compounds they react with. The substances which are considered to be the most active "bases" are those which are compounds of the elements forming basic compounds in ordinary chemical reactions in water solutions such as calcium, magnesium, and sodium. The most active "acid" impurities are compounds of silicon, titanium, zirconium and aluminum. Fluxes are prepared with a higher or lower percentage of acidic or basic compounds, depending on the type of metal to be welded and impurities in the metal. In some instances, other materials may be added to lower the slag melting point, to improve slag fluidity, and to serve as binders for the flux particles.

One problem encountered in the welding industry is the absorption of moisture by the flux covering on welding electrodes. During welding, the heat evaporates and dissociates the water, evolving hydrogen gas, which can dissolve into the metal. Under stress, the dissolved hydrogen in the weld metal may produce cracks with the potential for catastrophic failure of the weld. Hydrogen embrittlement is a phenomenon which involves loss of ductility and increased crack susceptibility in steel at room temperature due to the presence of hydrogen in the steel. Hydrogen induced cracking can occur to some extent whenever sufficient hydrogen and stress are present in a hard steel at temperatures above $-100°$ C. and below $150°$ C. As it is almost impossible to avoid producing these stresses in a weld, methods of crack control usually involve controlling the amount of hydrogen present in the weld, the microstructure of the solidified weld metal, or both. Hydrogen can be introduced into the weld arc atmosphere from a number of sources including oxides, contaminants and oil. The major source of hydrogen is moisture in the flux and flux binder.

Binders are used in granular fluxes and in electrode coatings to hold the components of the flux system together and/or to maintain the desired shape of the electrode coating about the metallic core during normal handling. Most welding flux formulations consist of an oxide-based material (flux) and additives bonded together by sodium silicate and/or potassium silicate (water glass). These types of binders are disclosed in U.S. Pat. Nos. 4,103,067; 4,131,784; 4,208,563; 4,355,224; 4,741,974 and 5,300,754, all which are incorporated herein by reference. Such binders have been particularly useful because they resist decomposition under conditions of use and because such binders provide adequate strength characteristics in the quantity added to the flux composition for the high rate of extrusion used in the manufacture of electrodes. In addition, the specific properties of either potassium silicate or sodium silicate makes each attractive for the manufacture of welding electrodes. For example, the drying characteristics are such that the liquid silicates used as binders for coating metal electrodes become hard films through the loss of water. The use of silicates in the flux can enhance arc stability during welding. The silicates in the flux provide a component to the flux which facilitates in adjusting the melting/freezing range of the slag. Silicates are easy to handle and use, thus making desirable for use as flux binders. Silicates are also relatively inexpensive, thus adding little cost to the flux composition. Sodium and potassium silicates have been particularly useful because their properties provide characteristics which are desirable in the manufacture of coated electrodes. With the addition of liquid sodium silicate to a dry powder formulation, the resulting mixture can be kneaded to a consistency that is appropriate for subsequent extrusion. The mass of kneaded mixture is typically formed into "slugs" which facilitates in handling during the time of storage and the loading of presses with the mixture for the extrusion operation. At present, a substantial portion of commercially produced coated electrodes are produced by the extrusion process. The plasticity of the flux coating on the wire electrode is somewhat controlled by the silicate addition in the flux mixture, but may also be influenced by other ingredients such as raw clay or bentonite which may be added or combined with silica or calcined clay. As the electrode is extruded, the electrode becomes reasonably solid and resists flattening as soon as the electrode leaves the die and falls on a conveyor belt. Drying of the extruded flux coating on the wire electrode is carried out at a relatively low temperature beginning at about $100-250°$ F. with controlled humidity in order to obtain uniform drying of the flux coating without cracking. This drying step is followed by one or more higher temperature drying steps at a lower humidity depending upon the nature of the flux coating. The moisture content of the dried flux coating on the electrode will typically range from less than 0.2% in some low hydrogen electrodes to as high as 3 to 6 percent in a cellulose type of electrode (e.g. E6010, E6011, etc.).

In high strength, low hydrogen electrodes, sodium silicate and/or potassium silicate binders have not been very satisfactory. Sodium silicate and potassium silicate binders are very hygroscopic and require some moisture to keep electrode coatings sound and free from cracks. During welding, the heat evaporates and dissociates the water, evolving hydrogen gas which can dissolve into the weld metal. Under stress, the dissolved hydrogen can produce cracks in the weld metal. The amount of moisture retained by silicate and/or potassium silicate binders is governed primarily by the temperature to which it has been dried. In an effort to decrease the possibility of weld bead cracks or failure, the presently available welding electrodes are baked at 370–540° C. or greater to decrease the water in the flux to less than 0.2%. The maintenance of this degree of dryness has been important in the welding of higher strength materials, and such maintenance of low water content necessitates careful handling to avoid hygroscopic moisture pickup during the use of these electrodes. Although moisture pickup has not been particularly troublesome in coatings for lower strength weld metal, the hygroscopic characteristics of the present day low hydrogen coatings has made it almost mandatory to use heated ovens to maintain the dryness of the flux coating to restrict the pick up of moisture. For high strength welds that require as low hydrogen content, the hygroscopic nature of the silicates in the flux coatings has been particularly damaging since, for example, in the EXX18 type of electrodes, the moisture content must be kept at a level below 0.2 percent. As a result, these electrodes can only be exposed to ambient conditions for a limited time before the flux absorbs moisture from the air and thus has to again be baked to reduce the moisture content. Some in the art are of the opinion that low hydrogen electrodes can not be successfully rebaked at low temperatures to sufficiently reduce the moisture content of the flux coating. As such, some skilled in the art are of the opinion that the most appropriate way to avoid hydrogen absorption by the weld metal is to keep the moisture content of the flux coating to a minimum after being initially dried. As a result, stringent controls have been placed on the moisture levels of the low hydrogen electrode. A flux system that solely uses water glass as a binder as several disadvantages, such as, but not limited to, a) when the water glass is not properly set at high temperatures, the flux system will absorb moisture significant amounts of moisture, and 2) the water glass requires a high setting temperature thus limiting the type of components that can be used in the flux system.

Several flux binders have been developed to address the problems associated with sodium silicate and potassium silicate binders. Several of these binders are disclosed in U.S. Pat. Nos. 2,720,473; 3,501,354; 3,783,020; 4,045,593; 4,103,067; 4,131,784; 4,208,563; 4,355,054; 4,571,480; 4,741,974; 5,300,754, GB 1,038,977; GB 1,571,136; JP 63-101093 and JP 1-233,093, all of which are incorporated herein by reference to disclose prior art flux binders and the past attempts to reduce the water content of prior art flux systems, and to also illustrate various elements and compounds that can be included in the flux system of the prevent invention.

U.S. Pat. No. 2,720,473 discloses a low hydrogen electrode that uses a potassium containing composition to reduce the moisture adsorption of the coating on the electrode. The potassium containing composition primarily includes potassium oxide, titanium oxide and silicon dioxide and at least divalent and at least trivalent oxide.

U.S. Pat. No. 3,501,354 discloses the use of a alkali metal aluminate as a flux binder to be substituted for alkali metal silicate binders.

U.S. Pat. No. 3,783,020 discloses an anti-hygroscopic coated electrode which uses a glass binder having a low melting point. The glass binder includes silicon dioxide and one or more other metal oxides.

U.S. Pat. No. 4,045,593 discloses a moisture resistant electrode by forming a protective film on the exterior surface of a flux coated electrode. The flux coated electrode is dipped into a solution of colloidal amorphous solid silica, quaternary ammonium colloidal silica sols, and soluble silicates of lithium and potassium and then dried.

U.S. Pat. No. 4,103,067 discloses a low hydrogen welding electrode that uses a hydrolyzed organic binder such as ethyl silicate which makes no substantial contribution to the moisture level and which makes the covering resistant to hygroscopic moisture pickup prior to welding. With proper drying in an inert gas protected atmosphere up to 537° C., the hydrolyzed ethyl silicate converts to silica with no moisture which results in a lower moisture content for the flux.

U.S. Pat. No. 4,662,952 discloses a welding flux binder hydrolyzed and polymerized from a mixture of tetraalkylorthosilicate, $Si(OR)_4$, wherein R is $-CH_3$, $-C_2H_5$ or $-C_3H_7$, alkali and alkaline earth salts. The welding flux made with this binder comprises an alkali-alkaline earth silicate, $M_2O.M'OSiO_2$, wherein M is lithium, sodium, potassium, or other element in Group I of the Periodic Table and M' is magnesium, calcium, barium, or other element in Group II of the Periodic Table and may further comprise metal compounds. Tetraalkylorthosilicate is an organometallic precursor to a ceramic binder. The organic portion is removed during processing of the weld flux binder and is not present in the final product. Unlike sodium silicate and/or potassium silicate binders, the binder contains a homogeneous distribution of alkali and alkaline earth ions and is not hygroscopic. This is a result of the use of tetraalkylorthosilicate and the presence of compounds which react to form $CaO$, $MgO$, $BaO$, or other alkaline earth oxides. The oxide compounds, particularly calcium compounds, act as stabilizing agents and make the fired binder non-hygroscopic.

Although these binders have addressed, some of the moisture pickup problems associated with sodium silicate and/or potassium silicate binders, many of the binders disclosed only marginally slow the moisture pickup of the electrode. Many of the other binders require additional coatings and/or incorporate time consuming and/or expensive procedures and/or materials that result in increased manufacturing costs for the electrode. In view of the present state of flux binder systems for low hydrogen electrodes, there is a need for a binder system that resists moisture pickup, which is easy to work with, which does not require special a application process or additional application steps, and which is not cost prohibitive to use.

SUMMARY OF THE INVENTION

The present invention pertains to welding fluxes, and more particularly, to a welding flux binder that resists water absorption and which can be used to bind a wide variety of fluxing components and/or metal alloying agents. The flux system which incorporates the use of a novel binder of the present invention can be used in all types of welding such as, but not limited to, submerged arc welding, shielded metal arc welding and non-shielded arc welding. Some non-limiting types of welding that in which the flux system can be used include MIG welding, STT welding, TIG welding, and SMAW welding. The flux system can be coated on a welding electrode, be inserted into the core of a metal electrode, and/or formed into a granular flux. The novel binder of the present invention addresses the problem of past flux systems concerning the problem associated with moisture absorption of the flux system after the flux binder has been dried. The novel binder of the present invention incorporates the use of a silicate in combination with colloidal material. The novel binder is used to successfully bind with a variety of flux agents and/or metal alloying agents in a flux system. As can be appreciated, the binder can include components that in addition to having binding attributes, also have fluxing attributes. Once the novel binder has been dried and set, the novel binder resists the absorption of moisture thereby maintaining a low moisture content of the flux system over extended periods of time. The novel binder is particularly useful for use in low hydrogen welding. The novel binder generally includes a majority weight percent silicate in combination with colloidal material, and typically at least about 60 weight percent silicate in combination with colloidal material, and more typically at least about 75 weight percent silicate in combination with colloidal material, and even more typically at least about 85 weight percent silicate in combination with colloidal material, and still even more typically at least about 95 weight percent silicate in combination with colloidal material.

In one aspect of the present invention, the novel welding flux binder of the present invention includes a silicate that includes potassium silicate and/or sodium silicate. Sodium silicate, also known as water glass, is less hygroscopic than potassium silicate. As a result, sodium silicate is typically selected over potassium silicate when only one of these silicates is to be used in the flux binder. Although sodium silicate exhibits lower hygroscopicity than potassium silicate, when AC current is used for the welding process, potassium silicate preforms better that sodium silicate when used in the binder. In one embodiment of the invention, the novel binder includes at least about 30 weight percent silicates, typically at least about 50 weight percent silicates, more typically at least about 60 weight percent silicates, still more typically at least about 75 weight percent silicates, and even more typically at least about 80 weight percent silicates. In another and/or alternative embodiment of the invention, the silicate that forms the binder includes over 90 weight percent sodium silicate, typically at least about 95 weight percent sodium silicate, and even move typically at least about 98 weight percent sodium silicate. In still another and/or alternative embodiment of the invention, the silicate that forms the binder includes over 90 weight percent potassium silicate, typically at least about 95 weight percent potassium silicate, and even move typically at least about 98 weight percent potassium silicate. In yet another and/or alternative embodiment of the invention, the silicate that forms the binder includes a combination of potassium silicate and sodium silicate. It has been found that certain combinations of potassium silicate and sodium silicate have a resulting hygroscopicity that is less than the hygroscopicity of potassium silicate or sodium silicate. A binder which includes the use of both potassium silicate and sodium silicate is also more versatile in that the flux binder performs well under an AC and DC welding conditions. In one aspect of this embodiment, the silicate that forms the binder includes at least a majority of potassium silicate and sodium silicate, typically at least about 60 weight percent potassium silicate and sodium silicate, and even more typically at least about 70 weight percent potassium silicate and sodium silicate, and still even more typically at least about 80 weight percent potassium silicate and sodium silicate, yet even more typically at least about 90 weight percent potassium silicate and sodium silicate, and still yet more typically at least about 95 weight percent potassium silicate and sodium silicate. In another and/or alternative aspect of this embodiment, the silicate that forms the binder includes a weight ratio of sodium silicate to potassium silicate of at least about 1.1:1, and typically at least about 1.5:1, and more typically about 1.5:1 to about 10:1, and even more typically about 1.5:1 to about 6:1, and still even more typically about 1.5:1 to about 4:1, and yet even more typically about 2:1 to about 3:1.

In another and/or alternative aspect of the present invention, the novel welding flux binder of the present invention includes colloidal material that can bind with one or more sites on a silicate molecule. In one embodiment, the colloidal material includes metal oxides. In one aspect of this embodiment, the metal oxides typically make up over about 30 weight percent of the particles of the colloidal material, more typically the metal oxides make up over about a majority weight percent of the particles of the colloidal material, still more typically the metal oxides make up over about 60 weight percent of the particles of the colloidal material, yet more typically the metal oxides make up over about 75 weight percent of the particles of the colloidal material, still yet more typically the metal oxides make up over about a 85 weight percent of the particles of the colloidal material, and even more typically the metal oxides make up over about a 95 weight percent of the particles of the colloidal material. In another and/or alternative aspect of this embodiment, the metal oxides that form the particles of the colloidal material include silicon dioxide. The silicon dioxide can be in a pure and/or unpure form. Examples of unpure forms include, but are not limited to, quartz, feldspar, mica, biotite, olivine, hornblende, muscovite, pyroxenes, and/or other sources of silicon dioxide. In one particular example of this aspect of the invention is that at least about 5 weight percent of the silicon dioxide in the colloidal material is a pure form of silicon dioxide, and typically at least about 10 weight percent, and more typically at least about 20 weight percent, and still more typically at least about 30 weight percent, and even more typically at least about 40 weight percent, and still even more typically at least about 50 weight percent, and more typically at least about 60 weight percent, and even more typically at least about 70 weight percent, and still more typically at least about 80 weight percent, and still even more typically at least about 90 weight percent, and yet even more typically about 100 weight percent of the silicon dioxide in the colloidal binder is pure silicon dioxide. One such source of pure silicon dioxide is sold as Indusil 508 by Kemira Chemicals. In another and/or alternative particular example of this aspect of the invention, at least about 30 weight percent of the metal oxides in the colloidal material are silicon dioxide, and typically at least about 50 weight percent, and more typically at least about 60 weight percent, and still more typically at least about 75 weight percent, and even more typically at least about 85 weight percent, and still even more typically at least about 90 weight percent, and more typically at least about 95 weight percent. In another and/or alternative embodiment of the present invention, the average particle size of the solid particles in the colloidal material is selected to be sufficiently small to achieve the binding effect of the colloidal material on the silicate in the binder. It has been found that when sufficiently small particles are used, a chemical binding effect on the surface of the particles results in the binding together of one or more of the silicate compounds of the novel binder. The binding of the colloidal particles to the silicate compounds results in a reduction of binding sites for water molecules. Consequently, when the water is expelled from the binder during the heating of the binder, the colloidal particles bind to the sites that were once occupied by water molecules and/or form a barrier around sites that were formerly bonded to water molecules. As a result, the novel binder has less sites that can or would be able to bond with water, thus reducing the hydroscopic properties of the novel binder. In one aspect of this embodiment, the average particle size of the particles in the colloidal material is less than about 100 nm, and typically less than about 70 nm, more typically less than about 60 nm, still more typically less than about 50 nm, even more typically less than about 40 nm, still even more typically less than about 30 nm, more typically less than about 20 nm, yet even more typically less than about 10 nm, and still yet even more typically about 0.5–10 nm, and more typically about 1–30 nm, still more typically about 2–25 nm, even more typically about 5–15 nm, and yet even more typically about 5–10 nm.

In still another and/or alternative aspect of the present invention, the colloidal material has a liquid component and a solid particle component prior to being dried. Generally, the liquid component primarily includes water; however, additional and/or alternative liquids can be used. The liquid is used to suspend the solid particles so as to allow the solid particles to bind the components in the flux system during the drying of the wetted flux system. In one embodiment of the invention, the liquid component of the colloidal material prior to drying generally includes less than about 90 weight percent liquid, typically less than about 80 weight percent liquid, more typically less than about 70–72 weight percent liquid, and still more typically about 60–71 weight percent liquid. In another and/or alternative embodiment of the invention, the liquid is substantially absent any hydrocarbon compounds. The introduction of hydrocarbon compounds in the liquid system can introduce hydrogen to weld metal during a welding process. In some flux systems, the reduction or elimination of hydrogen from the flux system is required to achieve the desired weld pool properties during a welding process. In one aspect of this embodiment, the liquid contains less than about 10 weight percent hydrocarbon compounds, typically less than about 5 weight percent hydrocarbon compounds, more typically less than about 2 weight percent hydrocarbon compounds, and even more typically less than about 0.05 weight percent hydrocarbon compounds.

In yet another and/or alternative aspect of the present invention, the solid particles in the colloidal material generally constitutes less than about 60 weight percent of the total weight of the novel binder after the drying of the novel binder. In one embodiment of the invention, the solid particles in the colloidal material constitute less than about 50% of the total weight of the novel binder, typically less than about 40% of the total weight of the novel binder, more typically less than about 30% of the total weight of the novel binder, still more typically less than about 20% of the total weight of the novel binder, yet even more typically no more than about 10% of the total weight of the novel binder, still more typically at least about 0.01% of the total weight of the novel binder, even more typically at least about 1% of the total weight of the colloidal novel binder.

In still yet another and/or alternative aspect of the present invention, a lithium compound is added to the novel binder to reduce the hygroscopicity of the novel binder. The lithium compound generally includes, but is not limited to, lithium alginate, lithium aluminate, lithium carbonate, lithium chromate, lithium hydroxide, and mixtures thereof. Lithium has been found to facilitate in decreasing the hygroscopic properties of a silicate containing binder. The lithium is believe to bond with and/or disrupt of the bonding of water molecule with the silicate in the novel binder. In one embodiment of the invention, the lithium compound constitutes less than about 20 weight percent of the dried novel binder, typically less than about 10 weight percent of the dried novel binder, more typically at least about 0.01 weight percent of the dried novel binder, and still more typically about 0.05–5 weight percent of the dried novel binder, and yet more typically about 0. 1–3 weight percent of the dried novel binder. In another and/or alternative embodiment of the invention, the weight percent of lithium compound in the novel binder is not more than the weight percent of the colloidal component in the novel binder. In one aspect of this embodiment, the ratio of the weight of colloidal component in the novel binder to the weight of lithium compound in the novel binder is at least about 1.05:1, typically about 1.1:1 to about 50:1, and more typically about 1.1:1 to about 10:1.

In a further and/or alternative aspect of the present invention, a ferrous alloy passivator is included in the novel binder. Ferrous alloys are commonly added to a flux system to form a weld bead having the designed chemical and physical properties. The inclusion of ferrous alloys in a binder system that includes silicates can result in bubbles or cracks forming in the coating during drying. These bubbles and cracks can result in the coating becoming separated from the wire electrode. It is believed that the ferrous alloy causes the pH of the flux system to be reduced thereby causing gas bubble liberation and cracks to form in the coating during drying. Chromate compounds have been found to reduce the gas bubble liberation and cracking of the flux coating. In one embodiment of the invention, a chromate compound is added to the flux system to passivate the ferrous alloys in the flux system. In one embodiment of the invention, lithium chromate is added to the flux system. As can be appreciated other and/or additional chromate compounds can be used. In another and/or alternative embodiment of the invention, the chromate compound content in the novel binder constitutes less than about 10 weight percent of the dried novel binder, and typically less than about 5 weight percent, and more typically at least about 0.005 weight percent.

In still a further and/or alternative aspect of the present invention, the novel binder includes silicates that have a molar ratio to form complex polymer structures when dried. Silicates includes silica and one or more other metal oxides (e.g., potassium oxide, sodium oxide, etc.). The mole ratio is defined as the amount of silica divided by the amount of alkali metal oxide. The fundamental building block of silicate solutions is the tetrahedral silicate anion. This consists of a silicon atom in the center of an oxygen cornered four-sided pyramid. To maintain charge neutrality, a hydrogen or alkali atom (e.g., sodium, potassium, etc.) typically is associated with each oxygen atom. Alternatively, the tetrahedral monomers can be linked together by sharing oxygen atoms, creating two- and three-dimensional structures (e.g., "trimer", "cyclic trimer", "cyclic tetramer", and "cubic octamer"). The character of the overall structure of the silicate in solution is affected by the molar ratio. The basis for this is the amount of cross-linking required to maintain charge neutrality. Each $SiO_4$ has an electrical charge of −4. In the soluble silicates, positively charged metal alkali ions are attached to the monomers. Increasing the molar ratio increases the amount of silica with respect to the quantity of alkali ions present. If there are not enough positively charged alkali ions to balance the electrical charge of each negatively charged monomer, oxygen atoms must be shared between adjacent molecules to maintain electrical neutrality.

This sharing of oxygen results in a higher concentration of polymers that form at the expense of monomers. Consequently, a high molar ratio (low alkali) causes a more complex high polymer to form resulting in less water retention. As such, the molar ratio clearly affects the structure of the dried silicate. Generally the molar ratio of silica to alkali metal oxide is at least about 1.3, and typically about 1.5–3.2. As can be appreciated, a higher molar ratio can be used. Silicate solutions are also very alkaline (high pH). The dissolved silica has a negative charge because the bonding requirements of the oxygen atoms in the monomer structure are not initially met. This charge on the silicate is felt by other species in the solution. Each of the species monomers, "trimers", "cyclic trimers", "cyclic tetramers", and "cubic octamers", and all of the permutations, will have a net negative charge. Since the various species are similarly charged (negatively), they repel one another. This repulsion of molecules is the basis for dispersion and deflocculating effects of silicates. Adding colloidal silica decreases the pH of the solution, and effectively increases the molar ratio, thereby causing more complex polymers to form. When the pH of the solution falls below about 10.7, the species in the solution no longer can maintain enough electrical charge to repel each other. They can no longer remain as separate species in solution, and consequently gel. With regard to the "binding ability" of the silicate, with the increasing molar ratio and enhanced cross-linking, the available bonds are consumed within the silicate. As a result, there is not enough net charge on each species to continue repelling the others within the silicate, thus causing more complex silicate polymers to form. Additionally, the lack of net charge reduces the binding ability of the silicate, because there is no electrical charge to promote binding to the flux particles. Decreasing the solids content (increasing the water content) will depolymerize the silicate solution, and decrease the binding ability. Upon dehydration, this can result in less complex polymeric structures. While the structure of liquid silicates is important, the concern in welding electrodes is with dehydrated silicate. To make low hydrogen electrodes, this initial moisture in the silicate binder must be removed. The process of dehydration of the silicate can be viewed as "drying", but just as accurately could be called polymerization with the rejection of water. Cations in the solution act to cross-link polymeric species. The polymeric units coordinate or link through the negatively charged oxygen atoms in the polysilicate. As the polysilicate units combine, the water is liberated. As drying proceeds, the amount of linking increases to an equilibrium level characteristic of the system at a particular temperature. Water is rejected to that point, while the equilibrium structure is being formed, but a certain amount remains. The initial structure of the silicate, before baking, will also have an effect because of the molar ratio. Higher baking temperatures lead to lower as-baked moisture, but also to lower moisture pickup. The water present on dehydration at least partially depends on the molar ratio. Under similar baking conditions, silicates with higher molar ratios tend to retain less moisture than silicates with lower molar ratios. Silicates with higher molar ratios have more polymeric units as opposed to monomer units in the liquid silicate, so have a higher probability of forming Si—O—Si bonds between particles during drying. More polymeric units in the liquid state will lead to a more close packed structure in the dehydrated structure. This close packed structure provides fewer sites for the binding of $H_2O$ molecules and results in lower as-received moisture.

Moisture can be present in the dehydrated silicates either as free water or bound water. Possible locations for the water include (1) surface water due to physical adsorption; (2) hydrogen bonded water; (3) Silanol (SiOH) groups; and (4) ionically hydrated water. Physical adsorption is caused by Van der Waals forces between adsorbate molecules (water) and the atoms comprising the adsorbent surface. In this case, the adsorbents are characterized by surface properties such as, but not limited to, surface area. A large specific surface area provides large adsorption capacity. Heating at 100° C. or desiccating at low relative humidity can remove such water. Water can also be hydrogen bonded to the surface silanol groups. This is a function of the silanol (SiOH) present on the surface of silicates. This water is released at around 125° C., which is a lower temperature than the decomposition of silanol groups. Water present as silanol (SiOH) groups on the polysilicate ions can decompose at high temperatures to form siloxane (Si—O—Si) bonds, accompanied with the release of $H_2O$. This reaction starts at approximately 200° C. This reaction occurs between silanol groups on the same polysilicate ions, as well as between neighboring polysilicate ions. The formation and decomposition of siloxane bonds with the release of water occurs gradually over a wide temperature range.

In yet a further and/or alternative aspect of the present invention, the novel binder can include additional components. Such additional component can include, but are not limited to, boric acid, borox, CMC, soluble carbonates, nitrates, oxillates or oxichlorides, various types of resins, sugar, starch, agar, clay, and/or the like.

In still yet a further and/or alternative aspect of the present invention, the novel binder of the flux system is formulated such that the novel flux binder can be dried and set at lower temperatures so as not to adversely affect one or more components of the flux system. Many prior art binder systems required the binder to be set at temperatures exceeding 650° C. (1200° F.) for extended periods of time. Such high temperatures can typically result in the oxidation of several of the metal alloys in the flux system and/or caused the release of carbon dioxide from one or more carbonates in the flux system when certain metals and/or carbonates are included in the flux system. The release of carbon dioxide from the flux system can result in less shielding gas being generated by the flux system during welding when carbonates are included in the flux system. The oxidation of one or more metal alloys in the flux system can result in the oxidation of certain metals, thus not allowing such metals to be alloyed in the weld metal, thus producing a less than desired weld metal composition. Reducing the temperature and/or time of drying of these prior flux systems can reduce the amount of carbon dioxide release from these flux systems and/or the amount of oxidation of the metal alloys in these prior flux systems; however, such temperature reduction and/or drying time can also result in the binder of these prior flux systems not being fully or properly set during the drying process. Such improper setting or drying of these prior flux systems resulted in a higher moisture content of the flux system and/or resulted in a greater degree of moisture absorption by the flux system during storage. The improper setting of the binder also resulted in the inferior binding together of the components of the flux system. The novel flux binder of the present invention overcomes the past problems of these prior flux systems by utilizing a unique binder system which dries and sets at lower temperatures than past binder systems, and which does not require the inclusion of hydrocarbon components to set the binder at lower temperatures. In addition, the novel binder can be dried to substantially eliminate the moisture content of the flux system and to maintain a low moisture content of the flux system over an extended period of time. In one embodiment of the present invention, the flux system is heated to a temperature of less than about 760° C. (1400° F.) during the drying and setting process of the binder in the flux system. The heating of the flux system to an elevated temperature is used to reduce the moisture content in the flux system and/or to set the binder of the flux system. Reduction in the moisture content of the flux system is desirable, since water, as a source of hydrogen, can adversely affect the properties of the weld metal during particular types of welding operations. Low moisture content of the flux system is particularly desirable in the formation of weld beads for high-strength steel. However, there are other welding applications wherein the moisture content of the flux can be significantly higher for desirable weld beads. In one aspect of this embodiment, the temperature that the flux system is exposed to a temperature during the drying and/or setting procedure that is less than about 705° C. (1300° F.), typically less than about 650° C. (1200° F.), even more typically less than about 594° C. (1100° F.), still even more typically less than about 538° C. (1000° F.), and still yet even more typically less than about 482° C. (900° F.). As can be appreciated, significantly lower temperatures during and/or setting temperatures can be used. As can also be appreciated, higher dry temperatures (e.g. above 705° C.) can be used when there are little or no concerns about metal oxidation and/or carbonate degradation of the flux system at higher drying temperatures. In another and/or alterative embodiment, the drying and/or setting time of the novel binder in the flux system at temperatures above about 250° C. (480° F.) is less than about 10 hours to obtain a moisture content of less than about 1 weight percent. In one aspect of this embodiment, the drying and/or setting time of the novel binder in the flux system at temperatures in excess of about 400° C. (750° F.) is less than about 8 hours, more typically less than about 5 hours, and even more typically less than about 4 hours. As can be appreciated, shorter and/or longer drying and/or setting times of the novel binder in the flux system can be used. Such time periods typically depend on the temperature at which the flux system is exposed, the water content of the flux system, the set time for the binder, and/or the desired moisture content of the flux system after the flux system has been dried. In another and/or alternative embodiment of the present invention, the moisture content of the flux system after the drying and/or setting of the flux system is typically less than about 6 weight percent, more typically less than about 3 weight percent, yet more typically less than about 1 weight percent, still more typically less than about 0.5 weight percent, and even more typically less than about 0.2 weight percent. The moisture content of the flux system after the drying and/or setting process will typically depend on the type of arc welding process being used. Flux systems used in high-strength steel welding processes wherein the hydrogen content is desired to be at extremely low levels, the moisture content of the flux system is typically less than about 1%, more typically less than about 0.4%, even more typically less than about 0.2%, and still even more typically less than about 0.15%.

It is a principal object of the present invention to provide an improved flux system in accordance with the present invention which includes silicate compound and a colloidal component to reduce the hygroscopic properties of the binder.

Another and/or alternative object of the present invention is the provision of an improved flux system that requires lower drying and/or setting temperatures, thereby providing a greater flexibility of the types of components that can be used in the flux system.

Still another and/or alternative object of the present invention is the provision of a flux system which resists moisture pickup for an extended period of time after the flux system has been dried and/or set.

Yet another and/or alternative object of the present invention is the provision of a flux system which can be used in a submerged arc welding process, can be coated onto an electrode, and/or can be used in the core of a flux cored electrode.

Still yet another and/or alternative object of the present invention is the provision of a flux system which includes a binder that chemically binds together one or more components of the flux system.

A further and/or alternative object of the present invention is the provision of a flux system which can be extruded on a metal electrode to form a coated metal electrode.

Still a further and/or alternative object of the present invention is the provision of a flux system that can be used with low hydrogen electrode.

Yet a further and/or alternative object of the present invention is the provision of a flux system that includes a colloidal compound and a lithium compound to reduce the hygroscopic properties of a flux system.

Still a further and/or alternative object of the present invention is the provision of a flux system that includes a binding made of a majority of silicate compound and a colloidal compound.

Another and/or alternative object of the present invention is the provision of a flux system that includes a binding made of a majority of silicate compound and a colloidal compound and a lithium compound.

Still another and/or alternative object of the present invention is the provision of a flux system that includes a binder system that resists moisture pickup, which is easy to work with, which does not require special a application process or additional application steps, and which is not cost prohibitive to use.

Yet another and/or alternative object of the present invention is the provision of a flux system that includes a binder system having a combination of potassium silicate and sodium silicate and colloidal silica.

Still yet another and/or alternative object of the present invention is the provision of a flux system that includes a binder system having a combination of potassium silicate and sodium silicate and colloidal silica, and the content of sodium silicate is greater than potassium silicate molar A further and/or alternative object of the present invention is the provision of a flux system that includes a binder system having silicates that have a molar ratio of to form complex polymer structures when dried.

A further and/or alternative object of the present invention is the provision of a flux system that includes a binder system and ferrous alloys and a ferrous alloy passivator.

These and other objects and advantages will become apparent from the discussion of the distinction between the invention and the prior art and when considering the preferred embodiment as shown in the accompanying drawings.

BRIEF DESCRIPTION OF THE INVENTION

Figure 1:
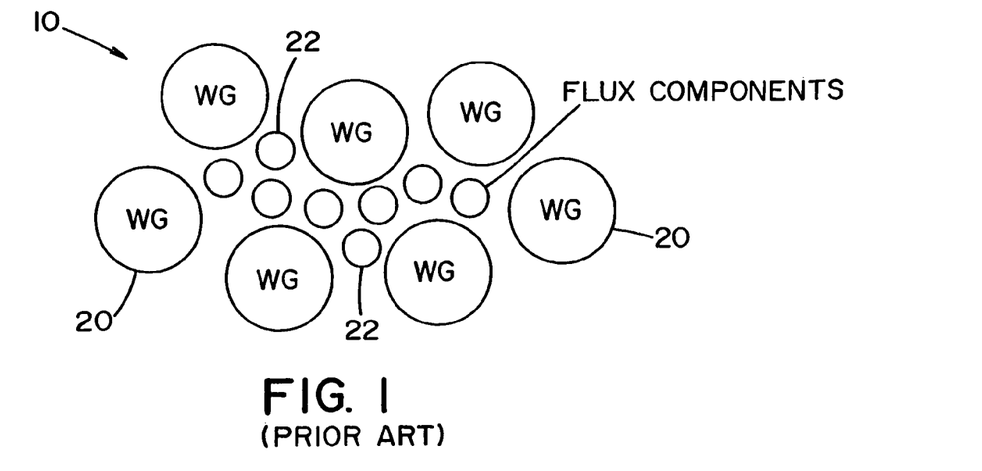
FIG. 1 is a illustration of a prior art flux system that includes large water glass compounds used to binder together smaller flux components.

Referring now in greater detail to the drawings, wherein the showings are for the purpose of illustrating preferred embodiments of the invention only, and not for the purpose of limiting the invention, FIG. 1 illustrates a prior art flux system 10 that includes a flux binder formed of water glass (WG) compounds 20 and flux components 30. The water glass components are typically made of potassium silicate or sodium silicate. The water glass typically makes up about 2–15 weight percent of the flux system; however, the percentage can widely vary depending on the particular makeup of the flux system. The flux components 30 typically include, but are not limited to, metal oxides (e.g., aluminum oxide, boron oxide, calcium oxide, chromium oxide, iron oxide, lithium oxide, magnesium oxide, manganese oxide, nickel oxide, niobium oxide, potassium oxide, rare earth metal oxides, silicon dioxide, sodium oxide, tin oxide, titanium oxide, vanadium oxide, zirconium oxide, etc.), metal carbonates (e.g., barium carbonate, calcium carbonate, dolomite, lithium carbonate, magnesium carbonate, rare earth carbonates, etc.), metal fluorides (e.g., barium fluoride, bismuth fluoride, calcium fluoride, cryolite, fluorspar, lithium fluoride, magnesium fluoride, potassium fluoride, sodium fluoride, Teflon, etc.), silicates other than water glass (e.g., aluminum silicate, feldspar, magnesium silicate, etc.), cellulose materials (e.g., CMC, etc.), and/or metal alloying agents (e.g, aluminum, boron, calcium, carbon, chromium, cobalt, ferroaluminum, ferrorchromium, ferromanganese, ferroniobium, ferrosilicon, ferrotitanium, ferrovanadium, ferrozirconium, iron, manganese, molybdenum, nickel, rare earth metals, silicon, titanium, tungsten, zirconium, etc.). The particular components used in the flux system and the amount of each of the components typically depend on the type of welding process (SAW, SMAW, FCAW) to be used, type of environment for the welding process (e.g., manual, automatic, etc.), position of the weld, and/or the type of workpiece to be welded.

As illustrated in FIG. 1, many of the particles of the flux components are smaller than the particles of water glass. The particles of water glass entrap many of the flux components between multiple particles of water glass. The water glass is particularly useful as a binder because it typically does not decompose under conditions of use and because it typically provides adequate strength characteristics in the quantity added to the flux composition for the high rate of extrusion used in the manufacture of such electrodes. In addition, the specific properties of water glass make the compound particularly attractive for the manufacture of welding electrodes. The drying characteristics of the water glass are such that the liquid silicates become hard films through the loss of water.

Water glass binders have been particularly useful because their properties provide characteristics which are desirable in the manufacture of covered electrodes. In general, the practical approach to the use of water glass binders has been to determine the grade which is best suited for the manufacturing operation and to control the quality of the covered electrode by maintaining the properties of the binders. Liquid water glass binder is typically added to a dry powder of flux component. The resulting mixture is typically kneaded to a consistency that is appropriate for subsequent extrusion. The mass of kneaded mixture is typically formed into "slugs" which facilitates handling during the time of storage and loading of presses for an extrusion operation about a metal wire (e.g., solid core, sheath, etc.).

The plasticity of the flux can be at least partially controlled by the type of water glass used and/or by other ingredients that are added to the binder and/or flux. For instance, raw clay or bentonite can be added to increase the plasticity of the binder and/or flux. As the mass of kneaded mixture is extruded about the metal wire, the extruded flux system becomes reasonably solid and resists flattening as soon as the electrode leave the die and is moved to a transport mechanism. The flux system is then dried to reduce the amount of moisture. The amount of moisture retained by the water glass in the flux system is governed primarily by the temperature to which it is subjected. It is known that room temperature air-drying of the water glass is not adequate for films or bonds that are to be used in welding. Drying of the water glass is typically carried out at a low temperature beginning at about 100–150° C. (200–300° F.) with controlled humidity in order to obtain uniform drying of the coating and to reduce incidents of coating cracking. The drying step is typically followed by one or more higher temperature drying steps at a lower humidity depending upon the nature of the flux system coating. The moisture content of the dried flux system coating typically ranges from less than about 0.1 percent in some low hydrogen electrode types to as high as 3–6 percent for cellulose type of electrodes. Electrodes of the high cellulose type (e.g., E6010 and E6011) which are used to produce ductile weld metal with a minimum of 60,000 pounds per square inch tensile strength, the use of water silicate binders can be particularly appropriate since the product may contain 3–4 percent moisture. However, in higher strength, low hydrogen type electrodes, such high moisture content is unsatisfactory. The drying of low hydrogen electrodes requires a high temperature treatment to drive off as much moisture as is necessary to meet the applicable specification for a particular electrode class. In addition, the maintenance of this low degree of dryness is important in the welding of higher strength materials and such maintenance necessitates careful handling to avoid hygroscopic moisture pickup during the shop use of these electrodes. The hygroscopic characteristics of low hydrogen coatings makes it typically necessary to use heated ovens to maintain the dryness of the flux system coating and to restrict the pick up of moisture by the flux system coating. For example, EXX18 type of electrodes require the moisture content to be kept at a level below 0.2–0.6 percent. In addition, the moisture content of low hydrogen coverings for E7015 and E7016 electrodes should be kept below 0.4 percent, and moisture content of low hydrogen coverings for E7028 electrodes should be kept below about 0.6 percent. If the moisture content is significantly above these maximum moisture vales for these types of electrodes, values, underbead cracking can occur and other undesirable effects may result. Production facilities for producing such welding electrodes have the capability of reducing the moisture content to a level of less than 0.1 percent and in some cases to less than 0.05 percent. However, it is difficult to maintain this low moisture level once the electrode is removed from a heat and low moisture environment. Water glass which principally includes sodium silicate is typically used in low hydrogen electrodes since sodium silicate is not quite as hygroscopic as potassium silicate and sodium silicate will dry to a lower moisture content than the potassium silicate. Due to the criticality of maintaining the moisture content of low hydrogen electrodes, many electrode manufacturers recommend that all unused low hydrogen electrodes after either a two hour exposure or a working shift should be redried in an oven maintained at 250°–350° F. for at least eight hours before reusing the electrodes. In addition, some electrode manufacturers seal the dried electrodes so as to maintain the low moisture content of the electrode.

Figure 2:
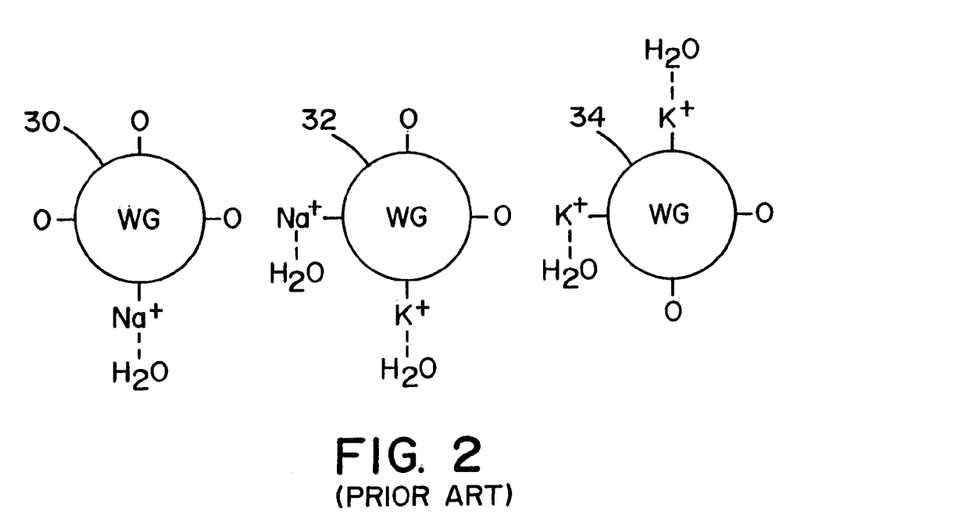
FIG. 2 is a illustration of water glass compounds that include potassium silicates and sodium silicates.

The hygroscopic properties of the water glass binder are illustrated in FIG. 2. Three water glass components 30, 32, 34 are represented. Each of the water glass compounds includes several oxygen bonds and one or more sodium and/or potassium bonds. The water glass compounds are also represented as having water molecules boned to the sodium and/or potassium. Water is a di-polar molecule, thus can bond to positively and negatively charged sites. The sodium and potassium are represented as positively charged sites. The oxygen bonds are negatively charged sites. For purposes of simplicity, the water molecules have not be illustrated as being bonded to the oxygen sites; however, such bonds can and do occur. The representation in FIG. 2 merely illustrates that water glass compounds have several sites to which water molecules can bond. As a result, when an electrode is exposed to the atmosphere, the ambient humidity in the air will be absorbed by the water glass binder on the electrode resulting in an increase in the moisture content of the electrode.

Figure 3:
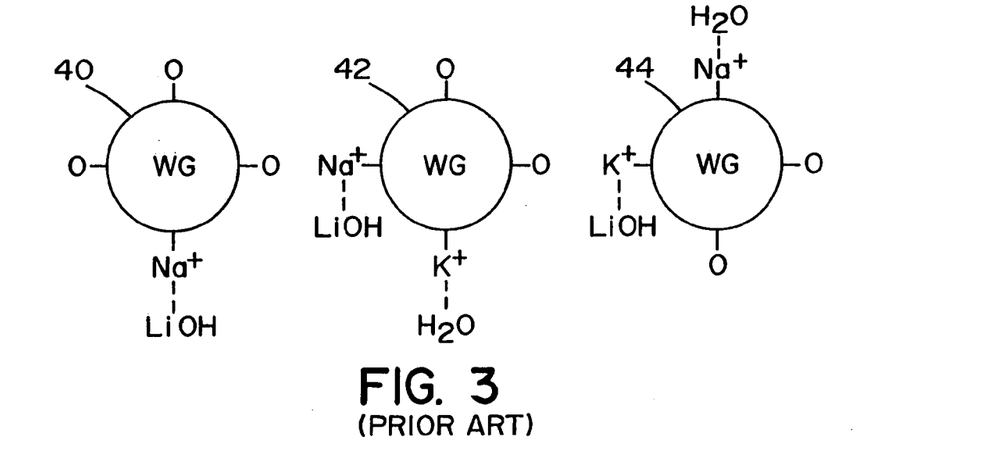
FIG. 3 is an illustration of water glass compounds that include potassium silicates and sodium silicates that have been combined with lithium.

FIG. 3 is representative of three water glass components 40, 42, 44 that include a lithium compound such as, but not limited to, lithium hydroxide bonded to one or sites on the water glass compounds. Lithium additions to water glass binders have been used in the past to reduce the hygroscopicity of the water glass binder. As shown in FIG. 3, the lithium hydroxide bonds with potassium or sodium thereby removing a site on the water glass that could have bonded with a water molecule. As a result of the lithium hydroxide bonding, less water bonding sites are available thereby translating into the binder being less hydroscopic. As shown in FIG. 3, the lithium compound does not block all the potential water bonding sites on the water glass compound. For instance, few, if any, oxygen bonding sites on the water glass compound are blocked by the lithium compound. In addition, not all of the potassium and sodium bonding sites are blocked by the lithium. This may be due to the crystalline structure of the water glass and/or the concentration of the added lithium compound to the flux system.

Figure 4:
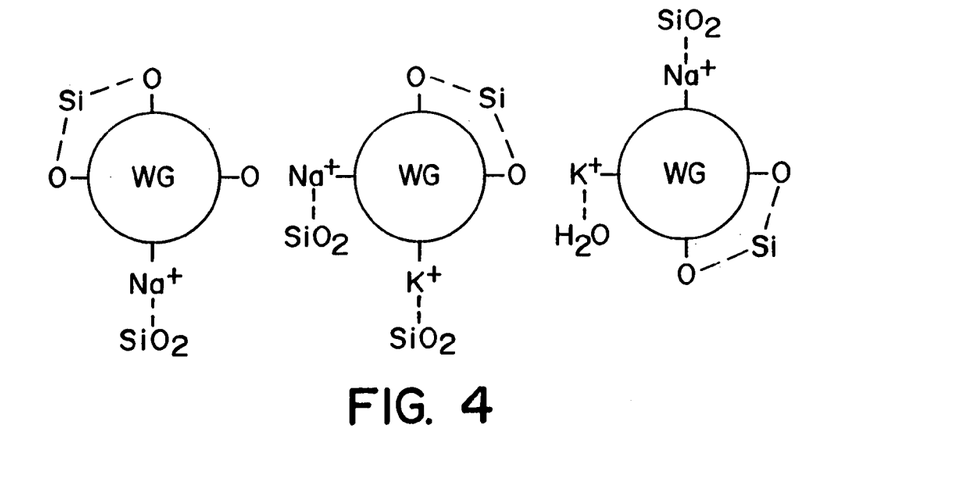
FIG. 4 is an illustration of water glass compounds that include potassium silicates and sodium silicates that have been combined with colloidal silica in accordance with the present invention.

Referring now to FIG. 4, a colloidal compound such as, but not limited, silica is added to the water glass binder. The silica can be from pure or unpure sources. Typically, a majority of the silica is from a pure source. Typically the particles of silica have an average particle size of about 2–25 nanometers, and more typically an average particle size of about 8 nanometers. The average particle size of the flux components is typically about 400 mesh (37 microns) or greater. As such, the particle size of the silicon dioxide is generally substantially smaller than the other components of the flux system. For instance, a flux component having an average particle size of about 400 mesh would be about 4625 times larger than a particle of silica having an average particle size of about 8 manometer. Typically, the water glass particle is at least over 100 times larger than the particles silica. The mechanism for binding by the water glass particles is the entrapment of the flux components between multiple particles of water glass. The combination of the water glass compound and colloidal silica constitute at least about 70 weight percent of the binder, and typically at least about 90 weight percent of the binder in the flux system. In addition, the weight percent of the water glass compound is typically greater than the weight percentage of the colloidal silica.

Silica particles have a negative charge and are attracted to the positively charge surface of the water glass compound, namely potassium and sodium. This bonding is illustrated in FIG. 4. The bonding of the silica to the potassium and sodium removes this site as a possible water molecule bonding site on the water glass. As a result of the silica bonding, less water bonding sites are available thereby translating into the binder being less hygroscopic. In addition, the silicon on the silica can become disassociated from the oxygen and in turn bond with the oxygen on the water glass compound. This is also illustrated in FIG. 4. As can be appreciated, the silicon bonding can also result in blocking potentially available water molecule binding sites. The position of silicon between two oxygen sites can result in the silicon covering a potential binding site of a water molecule with potassium or sodium and/or not allow room for a water molecule to bind with another oxygen site and/or a potassium or sodium site. Consequently, the colloidal silica is able to bond to more potential water molecule bonding sites on the water glass compound thus significantly reducing the hygroscopicity of the water glass compound in the binder of the flux system. The colloidal silica addition to water glass is also believed to result in the formation of more complex crystalline silicate structures when the binder is dried. These complex crystalline structures result in the oxygen on the water glass molecule binding with other water glass molecules. As a result of the tying up of oxygen in these complex crystalline structures, the number of available water molecule bonding sites is reduced. It has been found that when colloidal silica is added in a sufficient amount so as to increase the molar ratio of silica to alkali metal oxide in the water glass system to at least 2 or greater, the incidence of complex crystalline silicate structures increases. The lower hygroscopicity of the binder results in lower moisture pickup by the flux system thereby enabling the coated electrode to be exposed to the atmosphere for longer periods of time before having to be redried.

Figure 5:
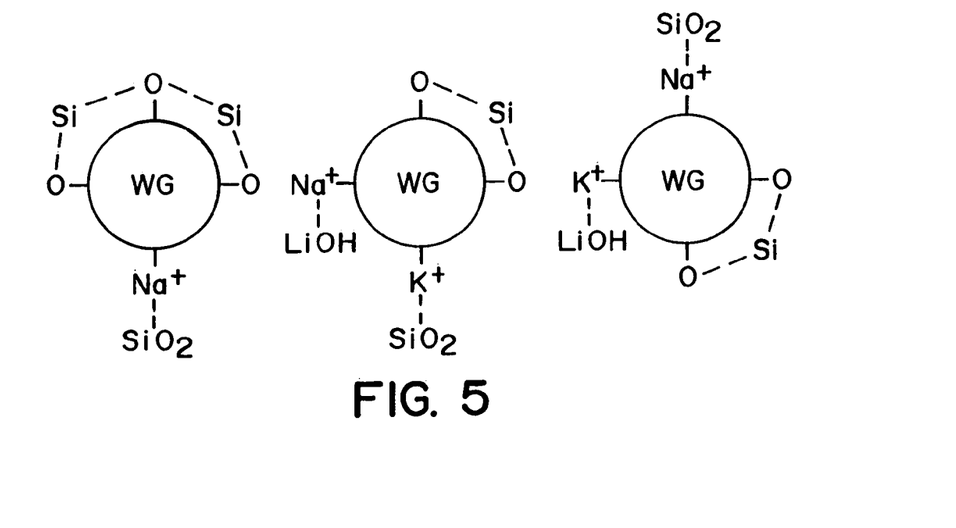
FIG. 5 is an illustration of water glass compounds that include potassium silicates and sodium silicates that have been combined with colloidal silica and lithium in accordance with the present invention; and, FIG. 6 is a graphical representation of the moisture pickup of various flux systems that are contained or are absent from the novel flux binder of the present invention.

Referring now to FIG. 5, a colloidal silica and a lithium compound such as, but not limited to, lithium hydroxide is added to the water glass binder. As described above, the silica particles have a negative charge and are attracted to the positively charge surface of the water glass compound, namely potassium and sodium. The bonding of the silica to the potassium and sodium removes this site as a possible water molecule bonding site on the water glass. As a result, less water bonding sites are available thereby translating into the binder being less hygroscopic. In addition, the silicon on the silica can bond with the oxygen on the water glass compound. The silicon bonding to the oxygen can result in blocking of potentially available water molecule binding sites and/or the removal of potentially available water molecule binding sites on the water glass. The inclusion of the lithium compound in the binder may also result in the lithium compound (e.g., lithium hydroxide, etc.) bonding to available potassium and sodium sites. The inclusion of both colloidal silica and a lithium compound in the water glass binder results in these two compounds tying up and/or blocking many water molecule binding sites of the water glass compound. Consequently, the colloidal silica and lithium compound significantly reduce the hygroscopicity of the water glass compound in the binder of the flux system.

Several general formations of a binder in accordance with the present invention is set forth in the following examples:

EXAMPLE A

| | |
|---|---|
| Potassium Silicate | 50–99.5% |
| Colloidal Silica | 0.1–40% |
| Lithium Compound | 0–20% |
| Misc. Binder agents | 0–25% |

EXAMPLE B

| | |
|---|---|
| Sodium Silicate | 50–99.5% |
| Colloidal Silica | 0.1–40% |
| Lithium Compound | 0–20% |
| Misc. Binder agents | 0–25% |

EXAMPLE C

| | |
|---|---|
| Potassium Silicate | 10–40% |
| Sodium Silicate | 20–80% |
| Colloidal Silica | 0.1–40% |
| Lithium Compound | 0.1–20% |
| Misc. Binder agents | 0–25% |

In the general examples set forth above, chromate compounds, when used, are included in the miscellaneous binder agents. In addition, boric acid, borox, CMC, soluble carbonates, nitrates, oxillates or oxichlorides, various types of resins, sugar, starch, agar, and/or clay, when used, are included in the miscellaneous binder agents.

Several specific formations of the binder are set forth as follows:

EXAMPLE 1

| | |
|---|---|
| Potassium Silicate | 75–99% |
| Colloidal Silica | 1–20% |
| (at least 75% silicate) | |
| Lithium Compound | 0–5% |
| Chromate Compound | 0–5% |
| Misc. Binder agents | 0–5% |

EXAMPLE 2

| | |
|---|---|
| Sodium Silicate | 75–99% |
| Colloidal Silica | 1–20% |
| (at least 75% silicate) | |
| Lithium Compound | 0–5% |
| Chromate Compound | 0–5% |
| Misc. Binder agents | 0–5% |

EXAMPLE 3

| | |
|---|---|
| Potassium Silicate | 10–40% |
| Sodium Silicate | 55–80% |
| Colloidal Silica | 1–15% |
| (at least 80% silicate) | |
| Lithium Compound | 0–5% |
| Chromate Compound | 0–4% |
| Misc. Binder agents | 0–4% |
| Weight Ratio of Na-Silicate/K-Silicate | 1.5–4:1 |

EXAMPLE 4

| | |
|---|---|
| Potassium Silicate | 10–30% |
| Sodium Silicate | 60–85% |
| Colloidal Silica | 1–15% |
| (at least 90% silicate) | |
| Lithium Compound | 0.2–3% |
| Chromate Compound | 0.1–2% |
| Misc. Binder agents | 0–3% |
| Weight Ratio of Na-Silicate/K-Silicate | 2–3:1 |
| Weight Ratio of Colloidal Silica/Li - Compound | 1.2–30:1 |

Figure 6:
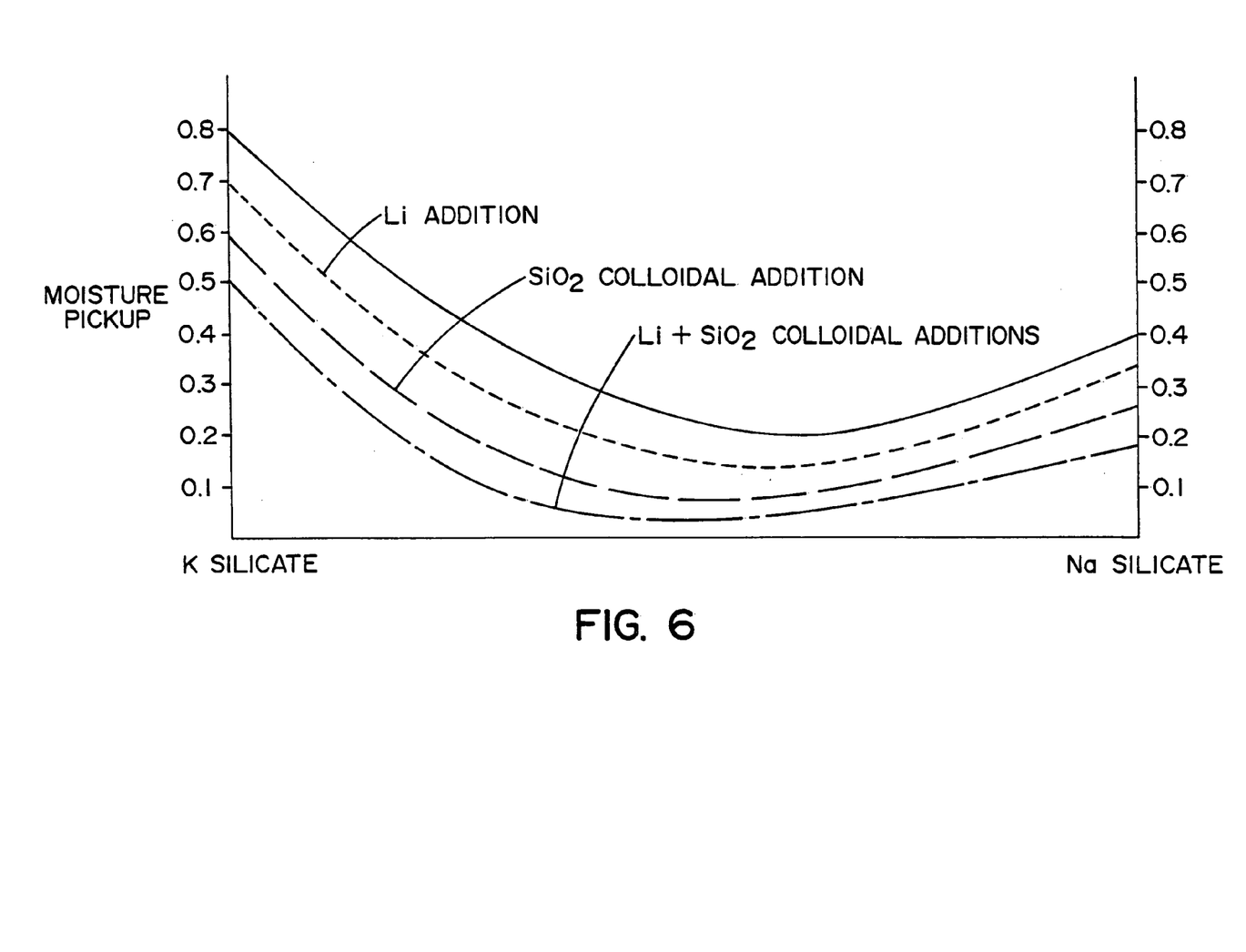

FIG. 6 is a graph which illustrates the relative hygroscopicity of the binder systems illustrated in FIGS. 3–5. FIG. 6 illustrates that potassium silicate is more hygroscopic than sodium silicate. Furthermore, FIG. 6 illustrates that a combination of potassium silicate and sodium silicate in the water glass can result in a lower hygroscopicity than water glass form solely of potassium silicate or sodium silicate. A weight ratio of about 2–3:1 of sodium silicate to potassium silicate results in an advantageous reduction in hygroscopicity of the water glass. FIG. 6 also illustrates that the addition of a lithium compound reduces the hygroscopicity of the water glass. The inclusion of colloidal silica in the binder reduces the hygroscopicity of the water glass to less than that of just adding a lithium compound. Finally FIG. 6 illustrates that the inclusion of colloidal silica and lithium compound in the binder reduces the hygroscopicity of the water glass to less than that of just adding a lithium compound or just adding colloidal silica. The addition of colloidal silica to a water glass binder significantly reduces the hygroscopicity of the binder on the welding electrode, thus resulting in an improved binding system for coated electrodes, especially for low hydrogen electrodes.

The novel water glass and colloidal silica containing binder can be used to form flux systems for use on coated electrodes, in submerged arc welding, and in flux cored electrodes. The process of forming the novel flux system for use in submerged arc welding or for a filling the core of a flux cored electrode is briefly described below. A dry blend of flux components and/or metal alloying agents is prepared or obtained. The size of the flux components and/or metal alloying agents is adjust as desired. Typically, the average size of the flux components and/or metal alloying agents is about 100–400 mesh. The flux components and/or metal alloying agents are then mixed with a wet binder which includes water glass and colloidal silica to form a wet mix. The binder can includes a lithium compound and/or one of more other binder components (e.g.,clay, ferrous alloy metal passifiers, etc.). The flux components can be first mixed with the binder and then metal alloying agents, or the metal alloying agents can be first mixed with the binder and then the flux components, or any other mixing order. The average particle size of the small particles in the colloidal silica are typically about 2–25 nanometers, and more typically about 8 nanometers. The use of water glass in the flux binder has several advantages that include, but are not limited to:

The water glass components ($Na_2O$ and/or $K_2O$) enhance arc stability.

The water glass provide a low melting component to the flux system which is helpful in adjusting the melting/freezing range of the slag during welding.

The water glass is easy to handle and use.

The water glass is a low cost material.

Once the binder and the flux components and/or alloying agents have been properly mixed together, the wet mix is dried in drying step. The wet mix can be dried by any conventional arrangement (e.g. oven, etc.). The drying temperature is typically about 800–1200° F. (426–649° C.); however, higher or lower temperatures can be used. When the flux system includes: carbonates, aluminum metal, magnesium metal and/or titanium metal, the drying temperature typically does not exceed about 1200° F. (649° C.) so as to reduce the amount of carbon dioxide disassociated from the carbonates and/or reduce the amount of oxidation of the aluminum metal, magnesium metal and/or titanium metal. The drying temperature for the binder can be as low as 200–600° F. so as to drive off the moisture in the wet mixture yet still achieves a desired amount of binding of the flux system. The flux system is dried until the desired or acceptable moisture content is obtained. For flux systems used in high strength welding, the moisture content is the flux system is typically reduced and maintained below about 0.2–0.6 weight percent.

Once the flux system as been dried, the flux system is ground and then screen to obtain an average particle size of the flux system of about 32–200 mesh; however, other average particle sizes can be used. The grinding and screen process is performed by standard techniques. The flux system containing the colloidal binder can be ground to finer or smaller particles sizes than compared to prior flux systems using binders such as, but not limited to, water glass, molasses, etc. The form flux system can be used as a submerged arc flux or be included in the core of a flux cored electrode. The flux systems which include colloidal silica in combination with water glass in the binder exhibit very little moisture absorption.

The novel flux binder can also be used to coated metal electrodes. A dry blend of flux components and/or metal alloying agents is prepared or obtained. The size of the flux components and/or metal alloying agents is adjust as desired. Typically, the average size of the flux components and/or metal alloying agents is about 100–400 mesh. The flux components and/or metal alloying agents are then mixed with a wet binder containing water glass and colloidal silica to form wet mix. As can be appreciated, the flux components can be first mixed with the binder and then metal alloying agents, or the metal alloying agents can be first mixed with the binder and then the flux components, or any other mixing order. Once the binder and the flux components and/or alloying agents have been properly mixed together, the wet mix is formed in a billet or slug in billet formation step. The billet is typically shaped into a large cylindrical configuration having a diameter of about 3–30 inches and a height of about 10–40 inches, and typically about 12 inches in diameter and about 14 inches high. The process for forming a billet is well known, thus will not be further described herein. The billet is then placed into an extruder that extrudes a controlled amount of flux system about the surface of an electrode. The extruder and process for extruding a flux system about an electrode is well known, thus will not be further described herein. The coated wire is thereafter progressively dried. The drying temperature typically begins at a lower temperature (e.g., 65° F.) and progressively increases in temperature to a maximum temperature (e.g., 649° F.) as the coated wire is slowly moved through a drying chamber or oven. As can be appreciated; higher or lower drying temperatures can be used. As can further be appreciated, the drying temperature does not have to continuously increase during the drying of the flux system, but can be maintained the same temperature or periodical decrease in temperature. The drying time is typically several hours and generally depends on the amount of moisture in the flux system prior to drying and the desired moisture content at the end of drying. The apparatus for drying is well known, thus will not be further described herein.

In summary, the binder system formed with water glass and colloidal silica exhibits several advantages over past binders such as, but not limited to:

The novel binder has excellent resistance to moisture pickup after being dried.

The novel binder can be dried/set at lower temperatures, thus allowing for a larger number of flux components to be used in the flux system.

The novel binder at least partially binds one or more flux components by a chemical process.

The novel binder can be dried/set at low or high temperatures.

The novel binder forms a strong bond with a wire electrode when coated on the surface of the wire electrode.

The formed flux system including the novel binder resists cracking.

The novel binder can be dried and crushed in by standard techniques.

The novel binder can be combined with other binders or be used as the sole binder for a flux system.

The novel binder eliminates the need to use organic binders that have typically been used when lower drying/setting temperature are required.

The novel binder can be used to form flux systems for submerged arc fluxes, fluxes coated onto an electrode, and/or fluxes used in a flux cored electrode.

The novel binder can reduce in the hydrolyzation of oxides in the flux system.

The novel binder can reduce the formation of hexavalent chromium, thus making the flux system more environmentally friendly.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A welding flux that resists moisture pickup comprising flux agent and binder; said flux agent including at least one compound selected from the group consisting of metal oxide, metal fluoride, metal carbonate, and mixtures thereof said binder including a majority weight percent of silicate, said silicate including potassium silicate, sodium silicate, and mixtures thereof; said binder including an effective amount of colloidal silica to reduce water binding sites on the silicate after said binder is at least partially dried, said colloidal silica having silica particles with an average particle size of less than about 100 nanometers.

2. The welding flux as defined in claim 1, wherein said silicate includes a majority weight percentage of potassium silicate plus sodium silicate, said sodium silicate having a weight ratio to said potassium silicate of about 1.5:1 to about 8:1.

3. The welding flux as defined in claim 2, wherein said weight ratio of said sodium silicate to said potassium silicate is about 1.5:1 to about 4:1.

4. The welding flux as defined in claim 1, wherein said average particle size of said silica particles is about 6–50 nanometers.

5. The welding flux as defined in claim 2, wherein said average particle size of said silica particles is about 6–50 nanometers.

6. The welding flux as defined in claim 4, wherein said average particle size of said silica particles is about 6–20 nanometers.

7. The welding flux as defined in claim 1, wherein said binder includes about 0.05 to about 45 weight percent colloidal silica.

8. The welding flux as defined in claim 2, wherein said binder includes about 0.05 to about 45 weight percent colloidal silica.

9. The welding flux as defined in claim 5, wherein said binder includes about 0.05 to about 45 weight percent colloidal silica.

10. The welding flux as defined in claim 1, wherein said binder includes about 0.05 to about 15 weight percent colloidal silica.

11. The welding flux as defined in claim 1, wherein said silicate has a molar ratio of silica to alkali metal oxide of at least about 1.5:1.

12. The welding flux as defined in claim 2, wherein said silicate has a molar ratio of silica to alkali metal oxide of at least about 1.5:1.

13. The welding flux as defined in claim 9, wherein said silicate has a molar ratio of silica to alkali metal oxide of at least about 1.5:1.

14. The welding flux as defined in claim 1, wherein said silicate has a molar ratio of silica to alkali metal oxide of at least about 2:1.

15. The welding flux as defined in claim 1, wherein said binder includes at least an effective amount of lithium compound to reduce water binding sites on said silicate after said binder is at least partially dried.

16. The welding flux as defined in claim 2, wherein said binder includes at least an effective amount of lithium compound to reduce water binding sites on said silicate after said binder is at least partially dried.

17. The welding flux as defined in claim 4, wherein said binder includes at least an effective amount of lithium compound to reduce water binding sites on said silicate after said binder is at least partially dried.

18. The welding flux as defined in claim 7, wherein said binder includes at least an effective amount of lithium compound to reduce water binding sites on said silicate after said binder is at least partially dried.

19. The welding flux as defined in claim 4, wherein said binder includes at least an effective amount of lithium compound to reduce water binding sites on said silicate after said binder is at least partially dried.

20. The welding flux as defined in claim 8, wherein said binder includes at least an effective amount of lithium compound to reduce water binding sites on said silicate after said binder is at least partially dried.

21. The welding flux as defined in claim 12, wherein said binder includes at least an effective amount of lithium compound to reduce water binding sites on said silicate after said binder is at least partially dried.

22. The welding flux as defined in claim 13, wherein said binder includes at least an effective amount of lithium compound to reduce water binding sites on said silicate after said binder is at least partially dried.

23. The welding flux as defined in claim 15, wherein said lithium compound includes lithium hydroxide, lithium carbonate, lithium alginate, and mixtures thereof.

24. The welding flux as defined in claim 1, including ferrous alloy and a ferrous alloy pacifier, said ferrous alloy pacifier including a chromium compound.

25. The welding flux as defined in claim 2, including ferrous alloy and a ferrous alloy pacifier, said ferrous alloy pacifier including a chromium compound.

26. The welding flux as defined in claim 22, including ferrous alloy and a ferrous alloy pacifier, said ferrous alloy pacifier including a chromium compound.

27. The welding flux as defined in claim 24, wherein said ferrous alloy pacifier includes $NaCrO_2$, $KCrO_2$, $LiCrO_2$, and mixtures thereof.

28. The welding flux as defined in claim 24, wherein said ferrous alloy includes FeMg, FeMn, FeNi, FeSi, and mixtures thereof.

29. The welding flux as defined in claim 1, wherein said colloidal silica prior to being dried includes a liquid and at least about 5 weight percent silica particles.

30. The welding flux as defined in claim 26, wherein said colloidal silica prior to being dried includes a liquid and at least about 5 weight percent silica particles.

31. The welding flux as defined in claim 29, wherein said silica particles constitute at least about 25 weight percent of said colloidal silica prior to being dried.

32. A welding flux binder comprising a majority weight percent silicate and at least an effective amount of colloidal silica to reduce water binding sites on said silicate after said binder is at least partially dried, a majority of said silicate including sodium silicate and potassium, said sodium silicate having a weight ratio to said potassium silicate of about 1.5:1 to about 8:1, said silicate having a molar ratio of silica to alkali metal oxide of about 1.5:1 to about 9:1, said colloidal silica having silica particles with an average size of about 6–50 nanometers.

33. The welding flux binder as defined in claim 32, including at least an effective amount of lithium compound to reduce water binding sites on said silicate after said binder is at least partially dried.

34. The welding flux binder as defined in claim 33, wherein said lithium compound includes LiOH, $LiCO_3$, Li Alginate, and mixtures thereof.

35. The welding flux binder as defined in claim 32, wherein said lithium compound constitutes about 0.05 to 10 weight percent of said binder.

36. The welding flux binder as defined in claim 33, wherein said lithium compound constitutes about 0.05 to 10 weight percent of said binder.

37. The welding flux binder as defined in claim 34, wherein said lithium compound constitutes about 0.05 to 10 weight percent of said binder.

38. The welding flux as defined in claim 32, wherein said colloidal silica weight percent in said binder is greater than said lithium compound.

39. The welding flux as defined in claim 33, wherein said colloidal silica weight percent in said binder is greater than said lithium compound.

40. The welding flux as defined in claim 34, wherein said colloidal silica weight percent in said binder is greater than said lithium compound.

41. The welding flux as defined in claim 35, wherein said colloidal silica weight percent in said binder is greater than said lithium compound.

42. The welding flux as defined in claim 37, wherein said colloidal silica weight percent in said binder is greater than said lithium compound.

43. A method of forming a flux system having a lower water content and which resists moisture absorption comprising:
  forming a flux binder, said flux binder including a silicate and a colloidal compound, said colloidal compound including a liquid and at least about 20 weight percent small particles, said liquid including water, said small particles including at least about 10 weight percent silicon dioxide, said small particles having an average particles size of less than about 100 nanometers, said silicate including potassium silicate, sodium silicate, and mixtures thereof;
  mixing said flux binder with flux ingredients to form a flux mixture, said flux ingredients including a flux agent selected from the group consisting of metal oxide, metal fluoride, metal carbonate, and mixtures thereof; and,
  drying said flux mixture at a temperature of at least about 400° C. for at least about 30 minutes until a moisture content of said flux blend is less than about 1%.

44. The method as defined is claim 43, including the step of grinding said dried flux mixture to an average particle size of less than about 100 mesh.

45. The method as defined is claim 44, including the step of grinding said dried flux mixture to an average particle size of less than about 48 mesh.

46. The method as defined in claim 43, wherein said ground flux mixture is a submerged arc flux or a flux for a cored electrode.

47. The method as defined in claim 43, including the step of extruding said flux mixture about a metal electrode prior to drying said flux mixture.

48. The method as defined in claim 43, wherein said moisture content of said flux blend is less than about 0.6%.

49. The method as defined in claim 43, wherein said moisture content of said flux blend is less than about 0.2%.

50. The method as defined in claim 43, wherein said colloidal compound and metal silicate constitute at least about 80 weight percent of said flux binder, said metal silicate.

51. The method as defined in claim 43, wherein said dried flux binder includes at least about 0.1–35 weight percent colloidal compound.

52. The method as defined in claim 51, wherein said dried flux binder includes about 0.5–15 weight percent colloidal compound.

53. The welding flux as defined in claim 48, wherein said silicate includes a majority weight percentage of potassium silicate plus sodium silicate, said sodium silicate having a weight ratio to said potassium silicate of about 1.5:1 to about 8:1.

54. The welding flux as defined in claim 53, wherein said weight ratio of said sodium silicate to said potassium silicate is about 1.5:1 to about 4:1.

55. The welding flux as defined in claim 43, wherein said silicate has a molar ratio of silica to alkali metal oxide of at least about 1.5:1.

56. The welding flux as defined in claim 55, wherein said silicate has a molar ratio of silica to alkali metal oxide of at least about 2:1.

57. The welding flux as defined in claim 43, wherein said binder includes at least an effective amount of lithium compound to reduce water binding sites on said silicate after said binder is at least partially dried.

58. The welding flux as defined in claim 57, wherein said lithium compound includes lithium hydroxide, lithium carbonate, lithium alginate, and mixtures thereof.

59. The welding flux as defined in claim 43, including ferrous alloy and a ferrous alloy pacifier, said ferrous alloy pacifier including a chromium compound.

60. The welding flux as defined in claim 59, wherein said ferrous alloy pacifier includes $NaCrO_2$, $KCrO_2$, $LiCrO_2$, and mixtures thereof.

61. The welding flux as defined in claim 59, wherein said ferrous alloy includes FeMg, FeMn, FeNi, FeSi, and mixtures thereof.

62. The welding flux as defined in claim 43, wherein said colloidal silica prior to being dried includes a liquid and at least about 5 weight percent silica particles.

63. The welding flux as defined in claim 62, wherein said silica particles constitute at least about 25 weight percent of said colloidal silica prior to being dried.

\* \* \* \* \*